United States Patent
Aoyama et al.

(10) Patent No.: US 6,706,991 B2
(45) Date of Patent: Mar. 16, 2004

(54) WELDING METHOD AND WELDING SYSTEM FOR PROJECTION BOLT

(75) Inventors: Yoshitaka Aoyama, 20-11, Makitsukadai-2-Cho, Sakai-Shi, Osaka 590-0114 (JP); Shoji Aoyama, Sakai (JP)

(73) Assignee: Yoshitaka Aoyama, Osaka (JP)

( * ) Notice: Subject to any disclaimer, the term of this patent is extended or adjusted under 35 U.S.C. 154(b) by 0 days.

(21) Appl. No.: 10/328,829

(22) Filed: Dec. 24, 2002

(65) Prior Publication Data

US 2003/0127432 A1 Jul. 10, 2003

Related U.S. Application Data

(63) Continuation of application No. PCT/JP01/05560, filed on Jun. 28, 2001.

(51) Int. Cl.[7] .............................................. B23K 11/14
(52) U.S. Cl. ....................................................... 219/93
(58) Field of Search ............................. 219/93, 119, 95

(56) References Cited

U.S. PATENT DOCUMENTS 5,105,060 A * 4/1992 Tanaka et al. ................ 219/95
5,359,171 A * 10/1994 Aoyama ....................... 219/93

FOREIGN PATENT DOCUMENTS

| JP | 7-314147 | * 12/1995 |
| JP | 9-57458 | * 3/1997 |
| JP | 2000-317644 | * 11/2000 |

* cited by examiner

Primary Examiner—Clifford C. Shaw
(74) Attorney, Agent, or Firm—J.C. Patents

(57) ABSTRACT

A welding method and a welding system for a projection bolt are provided. The disclosure comprises a stationary welding machine (5) having supporting arms (8, 9), each of which is provided with a movable electrode (10) and a fixed electrode (11) and either of the electrodes has a receiving hole (13) formed thereon for receiving the shank (2) of the projection bolt (1), wherein a projection bolt feed apparatus (14) is mounted on the stationary welding machine (5). According to the disclosure, the projection bolt (1) is stopped in the position where the shank (2) of the bolt (1) is coaxial with the receiving hole (13), then, the shank (2) is inserted into the receiving hole (13). A robot apparatus (33) brings a work (37) in between both the electrodes, where the welding operation of welding the projection bolt (1) to the work (37) is completed.

12 Claims, 6 Drawing Sheets

WELDING METHOD AND WELDING SYSTEM FOR PROJECTION BOLT

CROSS-REFERENCE TO RELATED APPLICATION

This application is a continuation application of a PCT application Ser. No. PCT/JP01/05560 filed on Jun. 28, 2001. All of the disclosures are incorporated herein by reference.

BACKGROUND OF THE INVENTION

1. Field of the Invention

This invention relates in general to a welding method and a welding system for a projection bolt.

2. Description of Related Art

A projection bolt comprises a shank on which screw threads are formed, a flange formed on one end of the shank, and a welding projection formed on the surface of the flange opposite to the shank side, wherein the welding projection is melted to be welded to a plate-shape work. The Japanese Patent No. 2509103 discloses an invention, in which a projection bolt, whose shank is inserted in a receiving hole formed on a movable electrode, is welded to a work, such as a steel plate and the like, when the movable electrode moves forward. The projection bolt is stopped first on the axis of the movable electrode, then is moved along the axis, and the shank of the projection bolt is inserted in the receiving hole.

The prior art described above provides a desired effect as a mechanism for moving a projection bolt and inserting the shank of the bolt in a receiving hole on an electrode. The insertion length for the shank, however, is not accurately controlled in the prior art. As a result, such a case may occur that an inserting rod resets at a stage at which the insertion length is insufficient, or that the projection bolt is inserted excessively enough to make a member holding the bolt interfere with the extremity of the electrode. The former case causes the bolt to come off from the receiving hole, due to the insufficient insertion of the bolt, and the latter case results in damaging the extremity of the electrode or the bolt holding member. These problems occur because the rod for bolt insertion is driven by fluid pressure supplied by an air cylinder and the like. To solve the problems, the behavior of components, such as the electrode, rod and so forth, must be set in a proper manner, particularly for dealing with a matter of how the shank of the projection bolt and the receiving hole on the electrode are allowed to take each relative position.

The prior art described above provides a desired effect as a mechanism for inserting a projection bolt in a receiving hole on an electrode. The prior art, however, lacks a particular consideration for improving the productivity of welding processes. Further, the prior art does not meet satisfactorily a demand that existing equipment is modified in the least extent to achieve the simplification of the equipment and reduction of an equipment cost. For such an operation that a projection bolt is welded to a small steel plate work, the above demand is particularly important. Besides, when the work moves forward to be positioned between two electrodes, a proper arrangement must be made so that the behavior of the work is not hampered. Meanwhile, in the prior art, the shank of the bolt cannot be inserted in the receiving hole of the electrode while the work is kept arranged between both electrodes.

SUMMARY OF THE INVENTION

According to one embodiment of the present invention, a welding method for a projection bolt is the method for welding the projection bolt having a shank, a flange, and a welding projection formed on the surface of the flange opposite to the shank side, to a plate shape work. The method comprises the following steps of: supporting the projection bolt by a holding head provided on a moving-back-and-forth feed rod in a state that the shank of the bolt is projected from the holding head; positioning the projection bolt on the axis of a movable electrode for moving back and forth by moving the feed rod; moving forward the movable electrode having a receiving hole for receiving the shank of the projection bolt and stopping the movable electrode from moving forward at the point that the shank is inserted into the receiving hole; retreating the holding head from the axis of the movable electrode for moving back and forth while the electrode is still; and, after the retreat of the holding head, moving forward the movable electrode again and welding the projection bolt to the work.

According to another embodiment of the present invention, a welding system for a projection bolt is the system for implementing the above welding method, that is, the welding system for welding the projection bolt having a shank, a flange, and a welding projection formed on the surface of the flange opposite to the shank side, to a plate shape work. The system comprises a welding machine on which a movable electrode and a fixed electrode are installed via supporting arms, respectively; a motor provided with a changing mechanism changing rotation into back-and-forth movement for moving the movable electrode; a receiving hole formed on the movable electrode for receiving the shank of the projection bolt; and a moving-back-and-forth feed rod provided with a holding head for holding the projection bolt in a state that the shank of the bolt is projected.

As the motor, an AC (Alternating Current) servomotor is typically employed, and the motor is equipped with the changing mechanism for changing rotation to back-and-forth movement. In general, the basic principle of the changing mechanism is that a screw shaft penetrates in a female screw block, which is rotated to make the screw shaft move back and forth, wherein a ball screw method is employed for reducing mechanical resistance produced upon operating the mechanism. In employing such a changing mechanism, the number of revolutions of the AC servomotor is set precisely according to a command from a controller, so that the extent of back-and-forth movement of the screw shaft can be controlled accurately.

The characteristics of the motor make it possible to determine precisely the stopping position of the movable electrode within a prescribed range. Therefore, the forward movement of the movable electrode is stopped instantly when the movable electrode moves toward the shank of the bolt in wait and the shank has come into the receiving hole in a prescribed length. While the movable electrode is still, the holding head retreats, and the movable electrode holding the projection bolt moves ahead again, pressing the welding projection to the work to be energized, then the welding operation ends.

In the above operation, the control of the mechanism for changing the rotation of the motor into back-and-forth movement and the drive control of the motor are executed properly and accurately, so that the stopping position of the movable electrode can be determined in a precise manner. This fact indicates that if the length of shank insertion in the receiving hole is less than a prescribed length, the holding head cannot be retreated. That is, the shank insertion with an insufficient length makes the shank incline abnormally in the receiving hole when the holding head retreats in the direction perpendicular to the electrode axis, making it difficult to insert the shank into the receiving hole smoothly. On the other hand, if the movable electrode is allowed to move forward to come too close to the holding head, the holding head and the movable electrode come to interfere, damaging each other.

It should be particularly noted in the present invention that the motor provides a control operation most appropriate for controlling the forward movement of the movable electrode. In other words, properly controlled output of the motor is sufficient enough to satisfy motion characteristics required for the movable electrode. If the forward movement of the movable electrode is controlled by a conventional technique, such as an air cylinder, it will be extremely difficult to temporarily stop the electrode within a required range and allow it to move forward again. In that case, the control will have to be made by a special two-stage cylinder. Also, according to the present invention, when the extent of forward movement by the movable electrode needs to be changed according to the replacement of a work or a projection bolt, changing the operation control memory of the motor allows the electrode to make necessary adjustment easily corresponding to the replacement of the work or bolt, eliminating the necessity for replacing an air cylinder as required in a conventional technique. Thus, controlling the movement of the electrode by the motor, as described here, has great advantages in terms of equipment arrangement and economy.

The feed rod is provided on a projection bolt feed apparatus, which can be mounted on part of the welding machine. Since the projection bolt feed apparatus is to be mounted on an existing welding machine as an additional component, a minor modification of the welding machine enables the installation of the feed apparatus on the welding machine. Therefore, it is also advantageous in terms of equipment arrangement and economy.

It is desirable that the projection bolt feed apparatus be arranged on the rear of the electrodes in the view across the length of the supporting arms. This arrangement prevents the projection bolt from interfering with a work when it comes into between the movable electrode and the fixed electrode. Both electrodes are arranged on the extremity of the supporting arms, respectively, so that the work is guided to a position between both the electrodes first, and is subjected to a welding operation smoothly without interfering with other members.

It is also desirable that a drive means for retreating the holding head from the axis of the movable electrode for moving back and forth be provided. When the movable electrode is moved forward and the shank of the bolt is inserted in the receiving hole in a prescribed length, the electrode stops moving at that point. Then, the holding head is retreated from the axis of the movable electrode for moving back and forth by the drive means. As described here, while the forward movement of the movable electrode is under accurate control, it is stopped and the holding head is retreated, so that the holding head is retreated after the bolt has been held surely in the receiving hole of the movable electrode. Therefore, the operation of moving forward the movable electrode and retreating the holding head is precisely carried out, which provides a highly reliable operability.

The feed rod can be inclined in two directions against the supporting arms, enabling the arrangement that the shank of bolt held by the holding head is stopped in the position where the bolt is coaxial with the receiving hole. With this arrangement, the feed rod is positioned so as to cross the supporting arms from a diagonal direction. As a result, the holding head holding the shank can make a linear motion to come and reach the position where the shank is coaxial with the fixed electrode.

According to another embodiment of the present invention, it is also provided a welding system for a projection bolt for welding the projection bolt having a shank, a flange, and a welding projection formed on the surface of the flange opposite to the shank side, to a plate shape work. The system comprises a stationary welding machine having multiple pairs of supporting arms, each supporting arm provided with a movable electrode and a fixed electrode, either of which having a receiving hole for inserting the shank therein. Projection bolt feed apparatuses are mounted on the stationary member of the stationary welding machine, and a work is held by a robot apparatus and is moved between both the electrodes.

The projection bolt feed apparatuses mounted on the stationary member of the stationary welding machine insert the shank of the projection bolt into each receiving hole of respective electrodes. In this state, the robot apparatus brings the work in between both the electrodes, and the movable electrodes operate, then the welding projection of the bolt and the work are pressed together, energized, and welded together. In this embodiment, both the electrodes and the projection bolt feed apparatuses are arranged as multiple pairs so that a multi-point bolt welding on one work becomes possible, which is effective for improving productivity. It is particularly emphasized that, by arranging the electrodes and bolt feed apparatuses as multiple pairs, welding operations are carried out at a plurality of spots on the work simultaneously or alternately, and the traveling distance of the work by the robot apparatus is shortened. Therefore, this embodiment makes it possible to weld a number of projection bolts in a brief operation time, having a great advantage for improving productivity.

The system described above can be achieved by modifying the arrangement of the welding unit of the stationary welding apparatus, replacing the single welding unit with a plurality of welding units, and arranging the projection bolt feed apparatuses according to the modification. Therefore, it becomes possible to reduce equipment cost and simplify equipment arrangement utilizing existing equipment. As described here, the stationary member of the stationary welding machine and the projection bolt feed apparatuses are combined as respective independent units, so that the welding of the projection bolt can be completed at a target spot on an incoming work while the bolt is kept fed on the electrodes. Besides, the modification required is simple, such that the projection feed apparatuses are mounted on an existing stationary welding machine. Since an existing robot apparatus is also used for this embodiment, no economic problem in terms of modification or arrangement arises.

Each projection feed apparatus can be arranged on the rear of the electrodes in the view across the length of the supporting arms. This arrangement prevents the projection feed apparatus from interfering with the work coming in between both the electrodes. Since each electrode is provided on the extremity of each supporting arm, the work is guided to the position between both the electrodes first, so that a welding operation is carried out as the work does not interferes with other members. This fact is very important for avoiding a problem of interfering in such a case that a work has a shape with complicated curves.

The projection bolt feed apparatus can be comprised of a holding head fitted on a moving-back-and-forth feed rod and a drive means for inserting the shank of a projection bolt in the receiving hole. The moving-back-and-forth feed rod moves into or retreats from between both the electrodes, allowing the projection bolt locked on the holding head to come in between both the electrodes. Particularly, the shank can be moved to the receiving hole in a precise manner by stopping the forward move of the feed rod in the position where the shank is coaxial with the receiving hole. The shank is inserted into the receiving hole by the output of the drive means, so that the bolt can be supplied in a highly reliable manner, following the forward move of the feed rod.

The drive means is fixed to the stationary member of the stationary welding machine, and has an output member on which a back-and-forth driving means for the feed rod is fixed. The feed rod is inclined in two directions against the supporting arms, so that the shank of the projection bolt held on the holding head is stopped in the position where the shank is coaxial with the receiving hole, and the shank is inserted into the receiving hole from that position. Since both the back-and-forth driving means for the feed rod and the drive means for guiding the shank to the receiving hole are arranged, moving the bolt in between both electrodes and inserting the shank into the receiving hole are performed without fail. This behavior is achieved mainly because of the fact that the back-and-forth driving means is fixed to the output member of the drive means. Further, the feed rod is inclined in two directions against the supporting arms, so that the projection bolt can be moved from the rear of the electrodes in between both electrodes. As a result, it becomes easy to arrange the projection bolt feed apparatus as a unit provided on the stationary member of the stationary welding machine.

Each pair of the movable electrodes, fixed electrodes, and projection bolt feed apparatuses can be arranged symmetrically on both sides divided by the center line of the work as multiple welding units. Arranged on both sides of the center of the work, each welding unit carries out a bolt welding on both sides of the work simultaneously or alternately. In addition, the above arrangement reduces the transfer distance of the work transferred by the robot apparatus, making it possible to welding a number of bolts in a short time.

Further, according to another embodiment of the present invention, it is also provided a welding system for a projection bolt for welding the projection bolt having a shank, a flange, and a welding projection formed on the surface of the flange opposite to the shank side, to a plate shape work. The system comprises a stationary welding machine on which a movable electrode and a fixed electrode are installed via supporting arms, respectively; a receiving hole formed on either of both the electrodes for receiving the shank of the projection bolt; a projection bolt feed apparatus mounted on the stationary member of the stationary welding machine; and a robot apparatus for holding a work and moving it in or from between both the electrodes; wherein the distance between the work and either of the electrodes is set so as to allow the projection feed apparatus to insert the shank into the receiving hole while the work is kept positioned between both the electrodes. Therefore, the bolt shank can be inserted into the receiving hole while the work is kept positioned between both the electrodes when the work is distanced from the electrode having the receiving hole, or made contact with the electrode without the receiving hole. Thus, bolts can be fed without moving a large work in every bolt feeding. In such a manner, welding efficiency is improved.

Hereinafter, the present invention is to be described in detail according to the drawings.

BRIEF DESCRIPTION OF THE DRAWINGS

While the specification concludes with claims particularly pointing out and distinctly claiming the subject mater which is regarded as the invention, the objects and features of the invention and further objects, features and advantages thereof will be better understood from the following description taken in connection with the accompanying drawings in which:

DESCRIPTION OF THE PREFERRED EMBODIMENT

Figure 11:
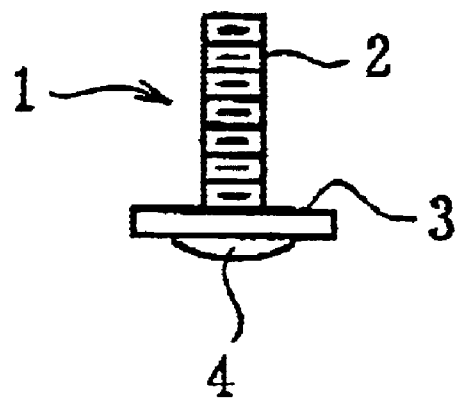
FIG. 11 is a side elevation of a projection bolt.

First, a projection bolt is described referring to FIG. 11. The projection bolt 1 is, for example, made of steel, having a shank 2, a circular flange 3 integrally formed with the shank 2, and a welding projection 4 formed on the surface of the flange opposite to the shank side. It is applicable to the embodiment to form a plurality of, for example three or four of, wart-shaped projections, instead of forming a welding projection with the illustrated shape.

Figure 1:
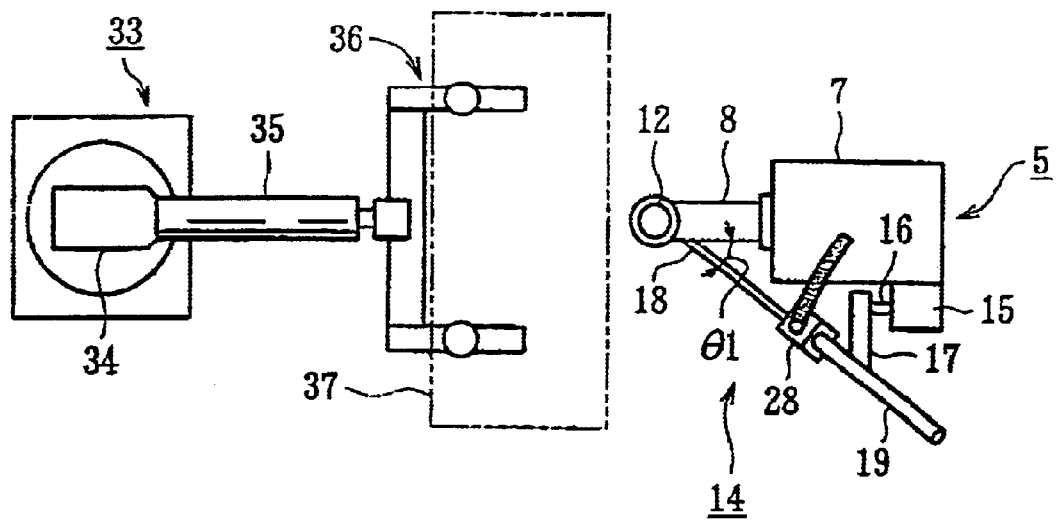
FIG. 1 is a plan of the projection bolt welding system showing one embodiment of the present invention.
Figure 2:
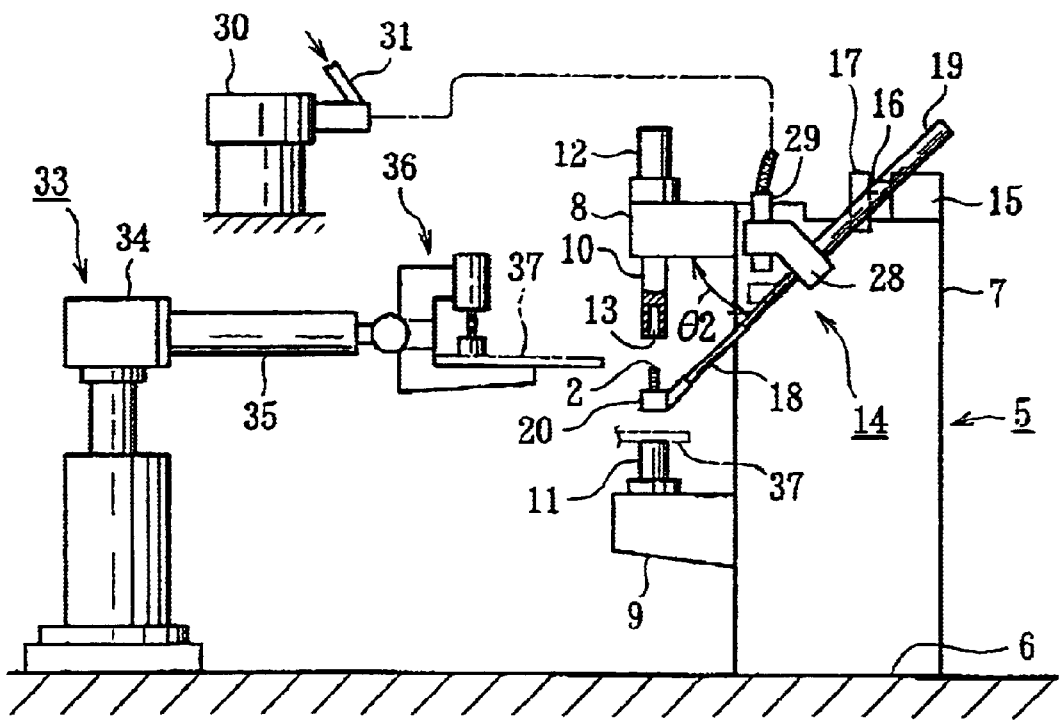
FIG. 2 is an elevation of the system illustrated in FIG. 1.
Figure 3D:
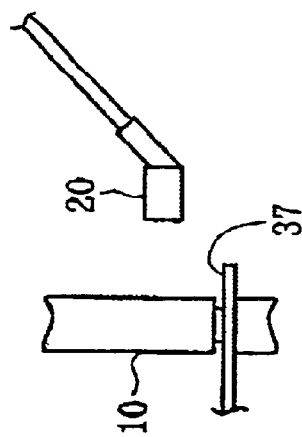
FIGS. 3A to 3D is a series of elevations showing an operational order.
Figure 3C:
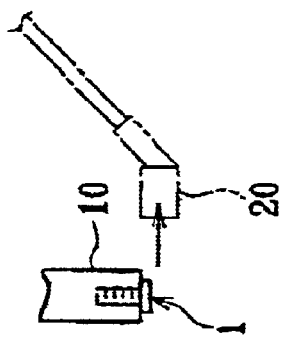
Figure 3B:
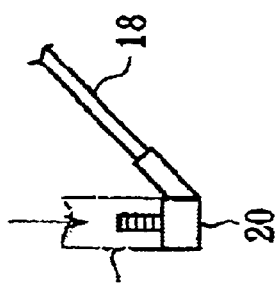
Figure 3A:
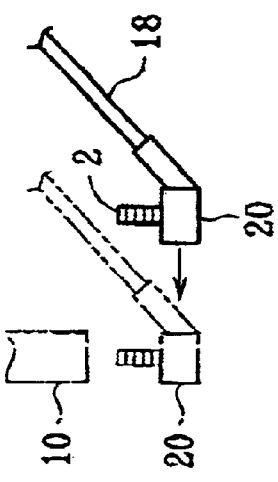

In FIGS. 1 and 2, a stationary welding machine, shown as a general view, is represented by a reference number 5, wherein supporting arms 8, 9 are joined to a pillar 7 erected on a floor 6. The supporting arms 8, 9 have a movable electrode 10 and a fixed electrode 11, respectively, wherein the movable electrode 10 is driven with a motor 12 mounted on the supporting arm 8. Either of the electrode 10 or electrode 11 is provided with a receiving hole 13 for receiving the shank 2 of the projection bolt 1. It is clearly shown in FIG. 2 and FIG. 4 that the movable electrode 10 is provided with the receiving hole 13.

A reference number 14 represents a projection bolt feed apparatus, which is arranged on the rear of the electrodes in the view across the length of the supporting arm 8. That is, the supporting arm 8 has the movable electrode 10 on its extremity, and the feed apparatus 14 is arranged on the rear of the electrode 10, as shown on the right in FIG. 1 and FIG. 2. In other words, when a work moves toward the stationary welding machine 5, the work comes in between both the electrodes 10, 11 first, where the feed apparatus 14 does not interfere with the work.

A drive means 5 is mounted on the upper part of the pillar 7. The output of the drive means 15 is taken out as a power for moving-back-and-forth movement, wherein the direction of the output itself is orthogonal to the axis of the movable electrode 10 for moving back and forth. The drive means 15 is comprised of an air cylinder having a piston rod 16 to which a bracket 17 is joined, wherein a back-and-forth driving means 19 for a feed rod 18 is fixed to the bracket 17. The means 19 is comprised of an air cylinder 19, which is integrated with the piston rod 16 via the bracket 17. A motor can be employed as a replacement for the air cylinder 15, i.e., the drive means 15, and for the air cylinder 19. In this case, a mechanism for changing the rotation of the motor to linear motion is provided as a mediating means. The drive means 15 is mounted on the stationary member of the stationary welding machine, wherein the side of the pillar represents the stationary member.

The feed rod 18 is inclined in two directions against the supporting arm 8 extending horizontally. The inclination is set as an angle of 0.1 in the view from the direction of FIG. 1 and 0.2 in the view from the direction of FIG. 2. Therefore, the feed rod 18 is kept in a position diagonally crossing the supporting arm 8. A holding head 20 is joined to the extremity of the feed rod 18, on which the shank 2 of the projection bolt is held, and the shank 2 is made coaxial with the receiving hole 13 when the holding head 20 has moved forward.

Figure 4:
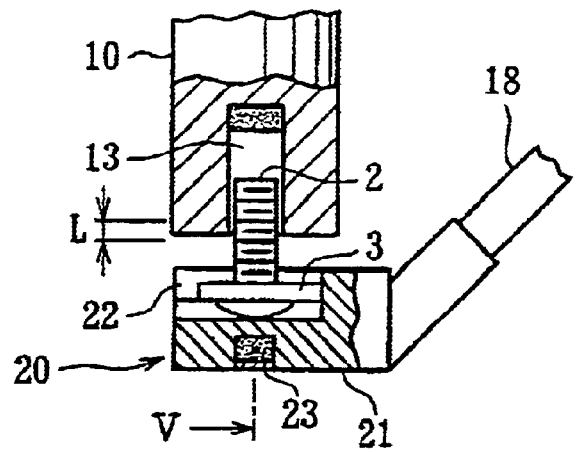
FIG. 4 is a longitudinal section showing the relation between one example of the holding head and the receiving hole.
Figure 5:
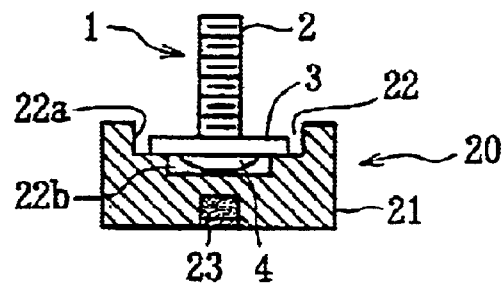
FIG. 5 is a longitudinal section of the holding head illustrated in FIG. 4.

The axis of the holding head 20 crosses the axis of the feed rod 18 in an acute angle. On a head body 21, a housing slot 22 having one open side is formed, the open side illustrated in FIG. 4 as the left side, for housing the flange 3. Since the welding projection 4 is integrally formed on the flange 3, the housing slot 22 not only comprises a large width part 22a for housing the flange 3, but also a small width part 22b for housing the welding projection 4, as shown in FIG. 5. A permanent magnet 23 is buried under the housing slot 22, attracting the flange 3 in the housing slot 22 to hold the projection bolt 1 in a stable manner. While the projection bolt is held, the outer periphery of the flange 3 is closely attached to the stepped portion of the surface of the housing slot 22.

Figure 6:
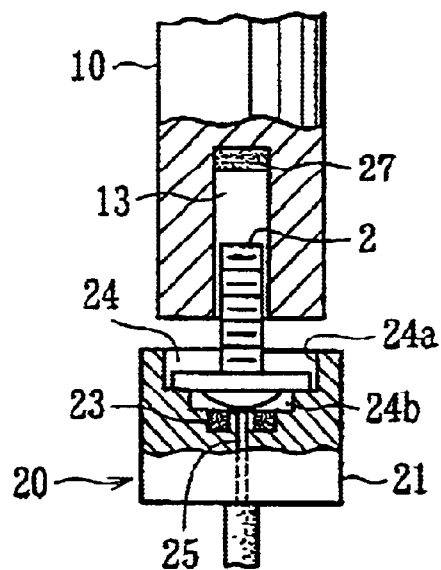
FIG. 6 is a longitudinal section showing the relation between another example of the holding head and the receiving hole.

FIG. 6 shows a recession 24, which is a variation of the housing slot 22. The recession 24 comprises a large diameter part 24a and a small diameter part 24b, which are formed for the flange 3 and the welding projection 4, respectively. An air passage 25 is formed in the center of the head body 21, providing an opening on the bottom of the small diameter part 24b. A character 26 represents an air hose connected to the air passage 25 and a character 27 represents a permanent magnet arranged deep inside of the receiving hole 13, wherein the magnet holds by its attractive force the bolt 1 inserted into the receiving hole 13. The magnet 27 is arranged in the same manner, as described in FIG. 6, in the embodiment shown in FIG. 4. Even if the upper-and-lower relationship between the receiving hole and the holding head, as shown in FIG. 4 and FIG. 6, is reversed, the bolt is retained stably, owing to the magnet 27.

When the feed rod 18 is retreated, an arrangement should be made so that the housing slot 2 or the recession 24 is prepared for receiving the flange 3. For the arrangement, a supporting strip 28 is fixed to the air cylinder 19, and the supporting strip 28 is joined to a part feed pipe 29, whose end is aligned with the holding head 20 in the retreated position (illustrated by a phantom line in FIG. 2). The part feed pipe 29 is connected to a parts feeder 30, which sends the projection bolt 1 by compressed air coming through an air hose 31, to the holding head 20.

A robot apparatus 33 is an ordinary general purpose robot of 6-shaft-type. The robot apparatus 33 has a joint arm 34 to which an air cylinder 35 having a chuck mechanism 36 fitted on its extremity is joined, wherein a steel work 37 is pinched firmly by the chuck mechanism 36. The work 37 held by the robot apparatus 33 is brought to a position separated from the electrode 10 having the receiving hole 13, as shown in FIG. 2, that is, to the position where the work 37 is in contact with the fixed electrode 11 or a small gap is formed between the work and the fixed electrode 11. The reason for bringing the work 37 to such a particular position is to allow the projection bolt feed apparatus 14 to insert the shank 2 into the receiving hole 13 while the work 37 is positioned between both the electrodes 10, 11. Therefore, it is arranged in such a way that the gap between the work 37 and either of the electrodes are set as an enough space to allow the shank 2 to be inserted into the receiving hole.

Figure 7:
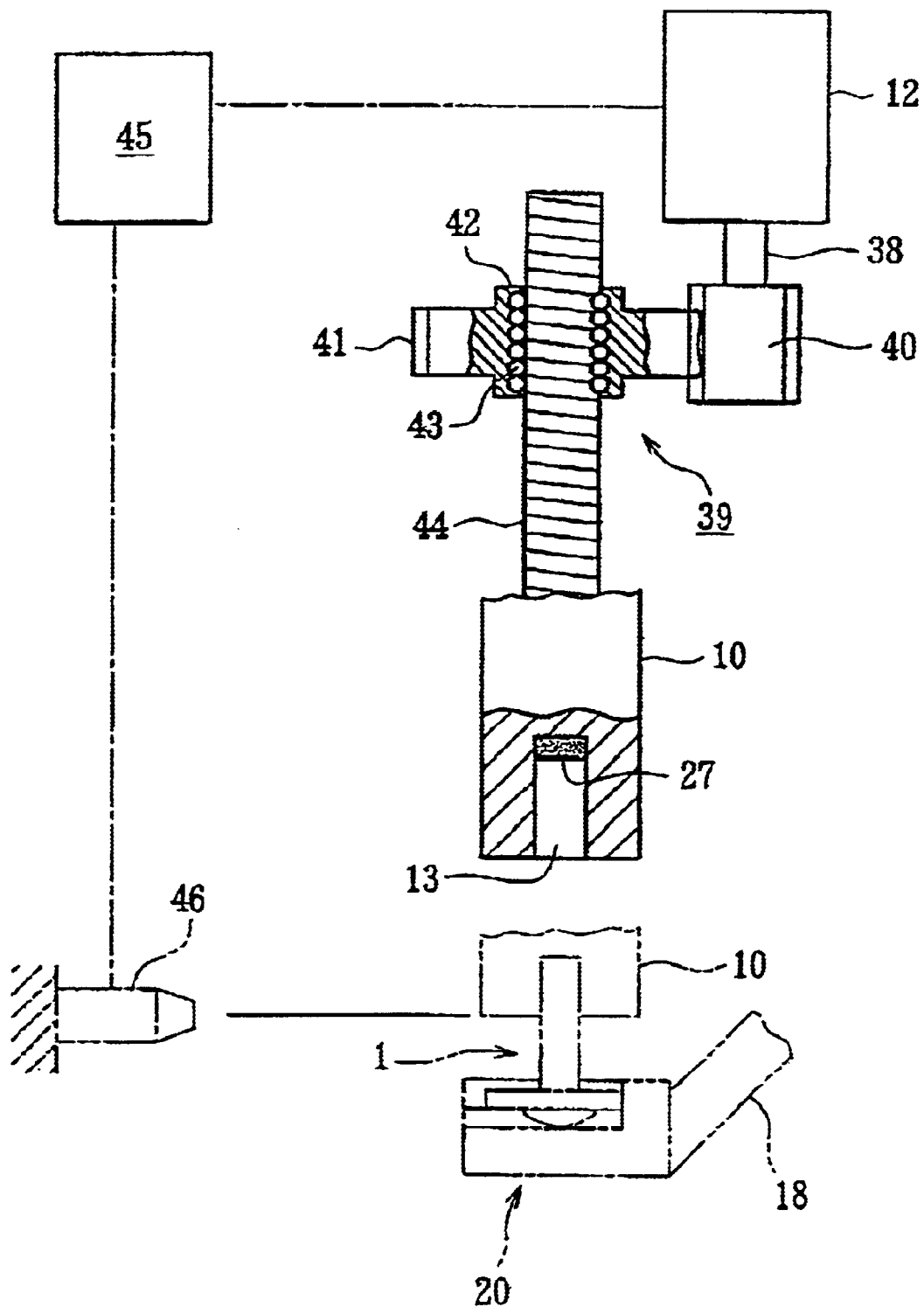
FIG. 7 is a longitudinal section showing a control system for the changing mechanism.

It is appropriate to employ an AC servo motor as the motor 12. As shown in FIG. 7, the motor 12 has an output shaft 38 outputting rotation. A changing mechanism 39 is provided for changing the output rotation to back-and-forth movement. Among various types of mechanisms that can be employed as such a mechanism, one of so-called ball screw unit types is used in this embodiment. In this case, a drive gear 40 fixed to the output shaft 38 is engaged with a driven gear 41 having cylindrical part 42, inside of which helical grooves are formed. A number of steel balls 43 are inserted in the helical grooves to support a screw shaft 44.

The screw shaft 44 has a built-in control circuit, which can set the relation between the number of revolutions of the motor 12 and the range of back-and-forth motion the movable electrode 10 makes. A controller 45 is made to memorize the length of a first stroke and of a second stroke to follow the first stroke. If the first stroke is long enough to surpass a stop range L shown in FIG. 4, the holding failure of the projection bolt, as mentioned before, will occur, so that it is essential to control the movable electrode to stop it within the stop range L. To meet such a demand, it is great advantage for controlling the forward stroke of the welding electrode to control the AC servomotor, as the motor 12, by the controller 45.

The first stroke represents the stage at which the movable electrode 10 is moved forward in the position shown in FIG. 4 and is stopped within the stop range L. In this state, the air cylinder 15 operates to move the holding head 20 to the right, leaving the shank 2 in the receiving hole 13. Then, the shank 2 attracted to the magnet 27 comes completely into the receiving hole 13, making the flange 3 closely attached to the end face of the movable electrode 10. On the following second stroke, the movable electrode 10 moves forward again, pressing the welding projection 4 to the work 37, and energizing the welding projection to complete the welding operation. When the movable electrode 10 returns to the original position, the projection bolt 1 remain welded to the work 37, and is transferred to the next process by the robot apparatus 33.

So far, a description has been made concerning the embodiment illustrated mainly by FIG. 1 to FIG. 7. Now, a further description is given regarding the operations in the above embodiment. When the holding head 20 is in the position illustrated by the two-dot chain line in FIG. 2, the parts feeder 30 sends the projection bolt 1 to the holding head 20. Then, the flange 3 of the bolt and the welding projection 4 are housed in the housing slot 22 or the recession 24, where the shank 2 of the bolt is kept projected upward from the holding head 20. Next, the feed rod 18 is moved forward and is stopped in the position where the shank 2 is coaxial with the receiving hole 13. Further, the movable electrode 10, which is under control by the motor 12, is moved forward to reach the stop range L and is stopped to finish the first stroke. After that, the holding head 20 is moved away to the right, as shown as a sidewise move in FIG. 4, by the drive means 15, so that the flange 3 slides along the inside of the housing slot 22 and the shank 2 remains inside the receiving hole 13.

As the second stroke, the movable electrode 10 is moved forward again, then, the welding projection 4 is welded to the work 37. Upon welding, the work 37 has been already brought in between both the electrodes by the robot apparatus 33, wherein the work 37 is made in contact with the fixed electrode 11. A series of operational orders described above are shown in FIG. 3 as step-to-step illustrations.

When the receiving hole is formed as the recession 24 as shown in FIG. 6, compressed air is blown out from the air passage 25 and the bolt with the shank 2 and the flange 3 is fitted completely into the receiving hole 13, then the holding head 20 is retreated.

In FIG. 7, a reference number 46 represents a sensor for detecting the forward movement of the movable electrode 10. The sensor 46 is provided as an additional component effective for improving operational accuracy. A signal form the sensor 46 is input in the controller 45, stopping the motor 12. More accurate stop position control can be made if a brake, which is not illustrated, is operated at the time of stopping the motor.

Figure 8:
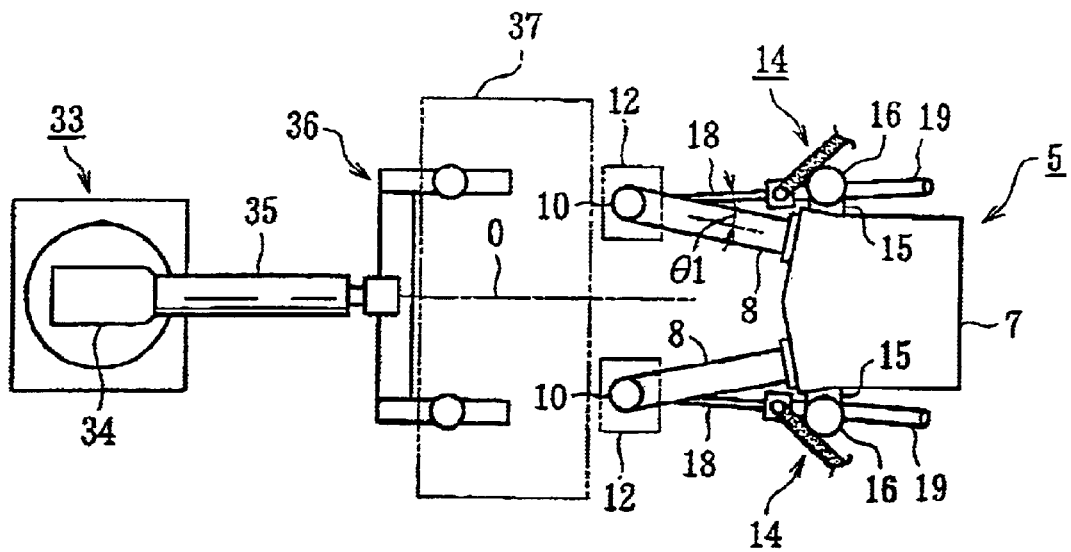
FIG. 8 is a plan of the projection bolt welding system showing another embodiment of the present invention.
Figure 9:
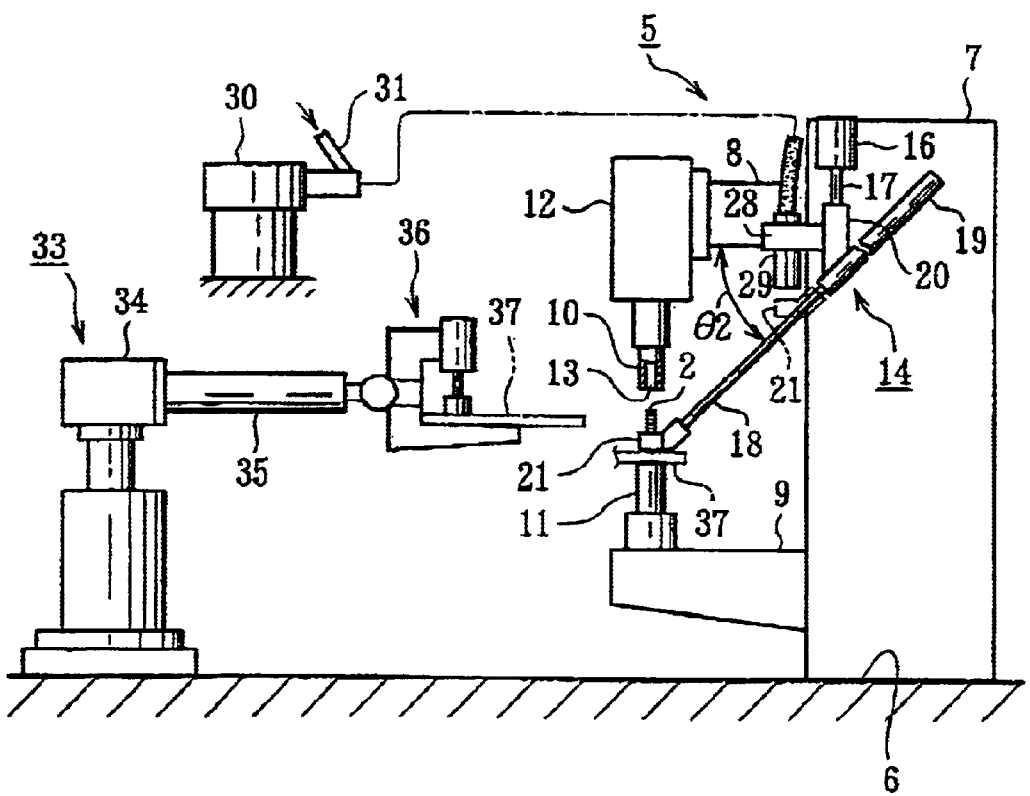
FIG. 9 is a longitudinal section of the system illustrated in FIG. 8.

Next, a reference is made to FIGS. 8 and 9. In the Figures, the stationary welding machine, shown as a general view, is represented by the reference number 5. The supporting arms 8, 9 are joined to the pillar 7 erected on the floor 6, wherein the supporting arms 8, 9 have the movable electrode 10 and the fixed electrode 11, respectively. The movable electrode 10 is driven with the air cylinder 12 mounted on the supporting arm 8. Either of the electrode 10 or electrode 11 is provided with the receiving hole 13 for receiving the shank 2 of the projection bolt 1. In this case, as clearly shown in FIG. 10, the receiving hole 13 is formed on the movable electrode 10. The air cylinder 12 can be replaced with a motor, where a mechanism for changing rotation to linear motion is used in combination.

The projection bolt feed apparatus, as shown in a general view, is represented by the reference number 14. The feed apparatus 14 is positioned on the rear of the electrodes in the view across the length of the supporting arm 8. That is, the supporting arm 8 has the movable electrode 10 on its extremity, and the feed apparatus 14 is arranged on the rear of the electrode 10, as shown on the right in FIG. 1. In other words, when a work moves toward the stationary welding machine 5, the work comes in between both the electrodes 10, 11 first, where the feed apparatus 14 does not interfere with the work.

In this embodiment, as illustrated in FIGS. 8 and 9, the movable electrode 10, the fixed electrode 11, and the projection bolt feed apparatus 14b are arranged as a set of components, and a plurality of them are provided on the stationary welding machine 5. FIG. 8 shows a case where two sets of the components are provided. The pillar is provided with a plurality of supporting arms 8, 9, each having the movable electrode 10 and the fixed electrode 11. A plurality of projection bolt feed apparatuses 14 corresponding to the receiving hole of each electrode are also arranged.

A bracket 15 is fixed to both sides of the pillar 7 and an air cylinder 16, as a drive means, is fitted on each bracket 15. Piston rods 17 are output members for the drive means, to which the moving-back-and-forth means 19 for the feed rods 18 are fixed. Each means 19 is comprised of an air cylinder, and the piston rod 17 and the air cylinder 19, i.e., the means 19, are coupled integrally via a coupling bracket 20 joined to the air cylinder 19. The air cylinders 16, 19 can be replaced with motors. Upon employing the motor, a mediating mechanism is provided for changing the rotation of the motor to linear motion. The drive means 16, i.e., the air cylinder 16, are mounted on the stationary members of the stationary welding machine, which are the sides of the pillar.

The feed rod 18 is inclined in two directions against the supporting arm 8 extending horizontally. The inclination is set as the angle of 0.1 in the view from the direction of FIG. 8 and 0.2 in the view from the direction of FIG. 9. Therefore, the feed rod 18 is kept in a position diagonally crossing the supporting arm 8. A holding head 21 is joined to the extremity of the feed rod 18, on which the shank 2 of the projection bolt is held, and the shank 2 is made coaxial with the receiving hole 13 when the holding head 21 has moved forward.

Figure 10:
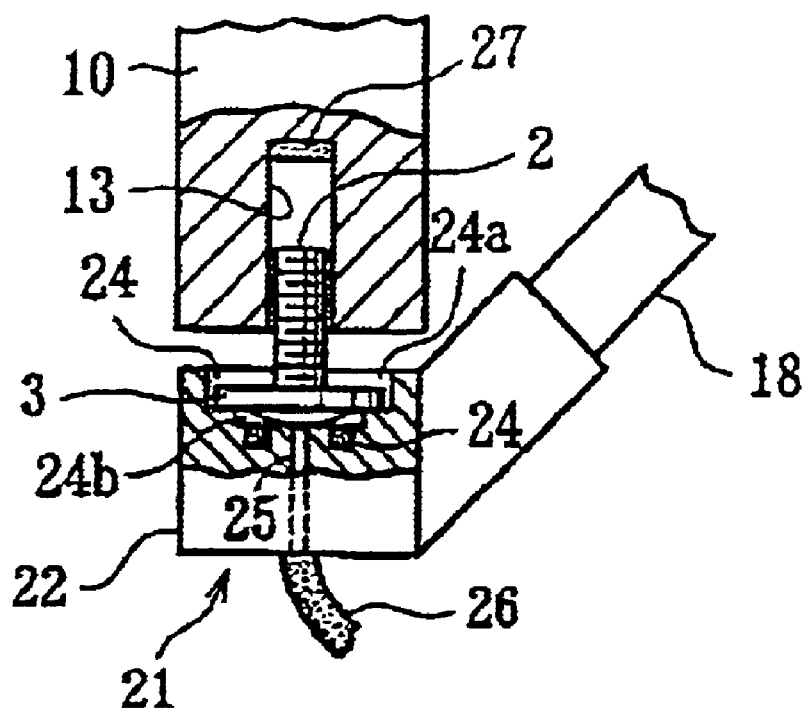
FIG. 10 is a longitudinal section showing the relation between the holding head illustrated in FIG. 6 and the receiving hole.

The axis of the holding head 21 crosses the axis of the feed rod 18 in an acute angle. On a head body 22, a circular recession 24 open upward is formed, as illustrated in FIG. 10, for housing the flange 3 of the projection bolt 1. Since the welding projection 4 is integrally formed on the flange 3, the recession 24 not only comprises a large diameter part 24a for housing the flange 3, but also a small diameter part 24b for housing the welding projection 4. The permanent magnet 23 is buried deep inside the recession 24, attracting the flange 3 in the recession 24 to hold the projection bolt 1 in a stable manner. While the projection bolt is held, the outer periphery of the flange 3 is closely attached to the bottom of the large diameter part 24a, as shown in FIG. 10.

The air passage 25 is formed in the center of the head body 22, providing an opening on the bottom of the small diameter part 24b. Compressed air is sent through the air passage 25, forcing the flange 3 to come off from the recession 24 against the attractive force of the magnet 23, and brings the shank 2 completely fitted into the receiving hole 13, wherein the compressed air is supplied at the time when part of the shank 2 comes into the receiving hole 13. The reference number 26 represents the air hose connected to the air passage 25. Once the bolt 1 has been fitted into the receiving hole 13, the bolt 1 is attracted and held securely with the permanent magnet 27 arranged deep inside the receiving hole 13. Even if the upper-and-lower relation between the receiving hole and the holding head is reversed, the bolt will be held in a stable manner with the magnet 27 as in the original state.

When the feed rod 18 is in the retreated position, it is necessary to prepare the recession 24 for receiving the flange 3 therein. For that preparation, the part feed pipe 29 is connected to the bracket 20 via the supporting strip 28, and the retreated holding head 21 is aligned with the end of the part feed pipe 29, as illustrated by a phantom chain line in FIG. 9. The part feed pipe 29 is connected to the parts feeder 30, which sends the projection bolt by compressed air supplied by the air hose 31, to the head 21.

The robot apparatus 33 is an ordinary general purpose robot of 6-shaft-type. The robot apparatus 3 has the joint arm 34 to which the air cylinder 35 having the chuck mechanism 36 fitted on its extremity is joined, wherein the steel work 37 is pinched firmly by the chuck mechanism 36. The work 37 held by the robot apparatus 33 is brought to a position separated from the electrode 10 having the receiving hole 13, as shown in FIG. 9, that is, to the position where the work 37 is in contact with the fixed electrode 11 or a small gap is formed between the work and the fixed electrode 11.

The reason for bringing the work 37 to such a particular position is to allow the projection bolt feed apparatus 14 to insert the shank 2 into the receiving hole 13 while the work 37 is positioned between both the electrodes 10, 11. Therefore, it is arranged in such a way that the gap between the work 37 and either of the electrodes are set as an enough space to allow the shank 2 to be inserted into the receiving hole.

Next, a further description relating to the operations in the embodiment illustrated mainly in FIGS. 8, 9, and 10 is to be given. When the holding head 21 is in the position illustrated by the two-dot chain line in FIG. 9, the parts feeder 30 sends the projection bolt 1 to the holding head 21. Then, the flange 3 of the bolt and the welding projection 4 are housed in the recession 24, where the shank 2 of the bolt is kept projected upward from the holding head 21. Next, the feed rod 18 is moved forward and is stopped in the position where the shank 2 is coaxial with the receiving hole 13. When the feed rod 18 moves away as the air cylinder operates, the shank 2 comes into the receiving hole 13, and completely fits into the receiving hole 13 as the compressed air from the air passage 25 blows out, then is attracted and held with the magnet 27. After that, the holding head 21 returns to the original position by tracing back the course of its proceeding.

The work 37 in a position away from the stationary welding machine 5 is grabbed by the chuck mechanism 36, and is brought in between both the electrodes 10, 11 by the functions of the air cylinder 35 and the like. At this time, the work 37 is stopped in the position where the work is in contact with the fixed electrode 11, as illustrated by a phantom line in FIG. 9. Then, the movable electrode 10 moves forward, pressing the welding projection 4 to the work 37 to be energized, and the projection bolt 1 is welded to the work 37. In this embodiment, such a welding operation as described above is carried out simultaneously or alternately on both sides of the work 37 divided by the center line 0 by multiple pairs, two pairs in this case of FIG. 9, of units. Following the completion of one or plurality of welding operations, the shank 2 of the next projection bolt 1 is inserted into each receiving hole and the chuck mechanism of the robot is moved to shift the position of the work 37 so that the next welding spot corresponds to the position of electrodes, then bolt welding is carried out again. When a plurality of bolts have been welded to the work as planed according to the above process, the robot apparatus 33 operates to retreat the work 37 from between both the electrodes 10, 11, completing the bolt welding operation on the work. Then, the work 37 is carried off for the next process.

While the work 37 is kept in contact with the fixed electrode 11, as illustrated in FIG. 9, the movable electrode 10 is retreated upward after the completion of bolt welding operation, the holding head 21 holding the bolt 1 is moved forward again, and the shank 2 is inserted into the receiving hole 13 to be held by the movable electrode 10. To enable the holding head 21 to insert the shank in a manner described above, a proper distance is secured between the work 37 and the movable electrode 10.

The embodiment illustrated in Figures cited here can be carried out even if the holding head and the receiving hole are set in the reversed position. The stationary welding machine includes supporting arms as its stationary member. Therefore, it is applicable to the embodiment to mount the projection bolt feed apparatus on the side of the supporting arm.

While the present invention has been described with a preferred embodiment, this description is not intended to limit our invention. Various modification of the embodiment will be apparent to those skilled in the art. It is therefore contemplated that the appended claims will cover any such modifications or embodiments as fall within the true scope of the invention.

What is claimed is:

1. A welding method for a projection bolt for welding the projection bolt having a shank, a flange, and a welding projection formed on the surface of the flange opposite to the shank side, to a plate shape work, comprising the following steps of:

supporting the projection bolt by a holding head provided on a moving-back-and-forth feed rod in a state that the shank of the bolt is projected from the holding head;

positioning the projection bolt on the axis of a movable electrode for moving back and forth by moving the feed rod;

moving forward the movable electrode having a receiving hole with a motor, which is provided with a changing mechanism changing rotation into back-and-forth movement, for receiving the shank of the projection bolt and stopping the movable electrode from moving forward at the point that the shank is inserted into the receiving hole;

retreating the holding head from the axis of the movable electrode for moving back and forth while the electrode is still; and moving forward the movable electrode again and welding the projection bolt to the work after the retreat of the holding head.

2. A welding system for a projection bolt for welding the projection bolt having a shank, a flange, and a welding projection formed on the surface of the flange opposite to the shank side, to a plate shape work, comprising:

a welding machine on which a movable electrode and a fixed electrode are installed via supporting arms, respectively;

a motor provided with a changing mechanism changing rotation into back-and-forth movement for moving the movable electrode;

a receiving hole formed on the movable electrode for receiving the shank of the projection bolt; and a moving-back-and-forth feed rod provided with a holding head for holding the projection bolt in a state that the shank of the bolt is projected.

3. The welding system for a projection bolt according to claim 2, further comprising a projection bolt feed apparatus mounted on part of a welding machine, wherein the projection bolt feed apparatus is equipped with a feed rod.

4. The welding system for a projection bolt according to claim 3, wherein a projection bolt feed apparatus is arranged on the rear of electrodes in the view across the length of the supporting arms.

5. The welding system for a projection bolt according to claim 2, further comprising a drive means for retreating a holding head from the axis of a movable electrode for moving back and forth.

6. The welding system for a projection bolt according to claim 2, wherein a feed rod is made inclined in two directions against supporting arms so as to allow the shank of the projection bolt held on a holding head to stop in the position where the shank is coaxial with a receiving hole.

7. A welding system for a projection bolt for welding the projection bolt having a shank, a flange, and a welding projection formed on the surface of the flange opposite to the shank side, to a plate shape work, comprising:

a stationary welding machine having multiple pairs of movable electrodes and fixed electrodes installed on the stationary welding machine via respective supporting arms, also having multiple motors each provided with a changing mechanism changing rotation into back-and-forth movement for moving one movable electrode;

a receiving hole for receiving the shank of said projection bolt, the receiving hole formed on either of said electrode;

a projection bolt feed apparatus mounted on the stationary member of said stationary welding machine; and a robot apparatus for holding said work and moving it in or from between both said electrodes.

8. The welding system for a projection bolt according to claim 7, wherein said projection bolt feed apparatus is arranged on the rear of an electrodes in the view across the length of said supporting arms.

9. The welding system for a projection bolt according to claim 7, wherein said projection bolt feed apparatus comprises a holding head fitted on a moving-back-and-forth feed rod having a back-and-forth driving means and a drive means for inserting the shank of a projection bolt into said receiving hole.

10. The welding system for a projection bolt according to claim 9, further comprising:

said drive means fixed to the stationary means of said stationary welding machine; and a back-and-forth driving means for a feed rod, which is fixed to the output member of said drive means, wherein, said feed rod is made inclined in two directions against said supporting arms, so that the shank of a projection bolt held on a holding head is stopped in the position where the shank is coaxial with a receiving hole and the shank is inserted from the stopping position into the receiving hole.

11. The welding system for a projection bolt according to claim 7, wherein multiple pairs of movable electrodes, fixed electrodes, and projection bolt feed apparatuses are symmetrically arranged on both sides divided by the center line of a work, respectively.

12. A welding system for a projection bolt for welding the projection bolt having a shank, a flange, and a welding projection formed on the surface of the flange opposite to the shank side, to a plate shape work, comprising:

a stationary welding machine on which a movable electrode and a fixed electrode are installed via supporting arms, respectively;

a motor provided with a changing mechanism changing rotation into back-and-forth movement for moving the movable electrode;

a receiving hole formed on either of both said electrodes for receiving the shank of the projection bolt;

a projection bolt feed apparatus mounted on the stationary member of the stationary welding machine; and a robot apparatus for holding a work and moving it in or from between both said electrodes, wherein the distance between the work and either of the electrodes is set so as to allow the projection feed apparatus to insert the shank into said receiving hole while the work is kept positioned between both said electrodes.

* * * * *